United States Patent [19]

Stephens

[11] 4,114,599
[45] Sep. 19, 1978

[54] SOLAR COLLECTOR

[76] Inventor: James W. Stephens, 1681 Tilling Way, Stone Mountain, Ga. 30082

[21] Appl. No.: 759,019

[22] Filed: Jan. 13, 1977

[51] Int. Cl.² .............................................. F24J 3/02
[52] U.S. Cl. .................................................. 126/271
[58] Field of Search ............................. 126/270, 271; 165/DIG. 8

[56]  References Cited
U.S. PATENT DOCUMENTS

| | | | |
|---|---|---|---|
| 3,215,134 | 11/1965 | Thomason | 126/271 |
| 3,239,000 | 3/1966 | Meagher | 165/DIG. 8 |
| 3,244,186 | 4/1966 | Thomason et al. | 126/270 X |
| 4,003,364 | 1/1977 | Balkus, Jr. | 126/271 |
| 4,030,478 | 6/1977 | Beaver, Jr. | 126/271 |
| 4,036,209 | 7/1977 | Press | 126/271 |

FOREIGN PATENT DOCUMENTS 1,009,332  11/1965  United Kingdom ............. 165/DIG. 8

Primary Examiner—William E. Wayner
Assistant Examiner—William E. Tapolcai, Jr.
Attorney, Agent, or Firm—Lawrence E. Laubscher

[57]  ABSTRACT

A light weight, low cost, non-corroding, high efficiency solar energy collector is comprised of an absorber plate which is adapted to absorb solar energy in the form of heat and to transfer by conductance the heat to a heat exchange medium. The absorber plate has disposed therein a highly heat conductive filler which imparts increased thermal conductivity to the plastic material of the absorber plate, and an energy absorbing pigment; or a sheet of a transparent plastic material is employed which transmits solar energy to a heat exchange medium which has dissolved therein a dye or pigment of a solar energy absorbing color. For a greater thermal conductivity, the sheet of transparent plastic material may have disposed therein a thin sheet of metal which absorbs and conducts heat to a heat exchange medium.

6 Claims, 7 Drawing Figures

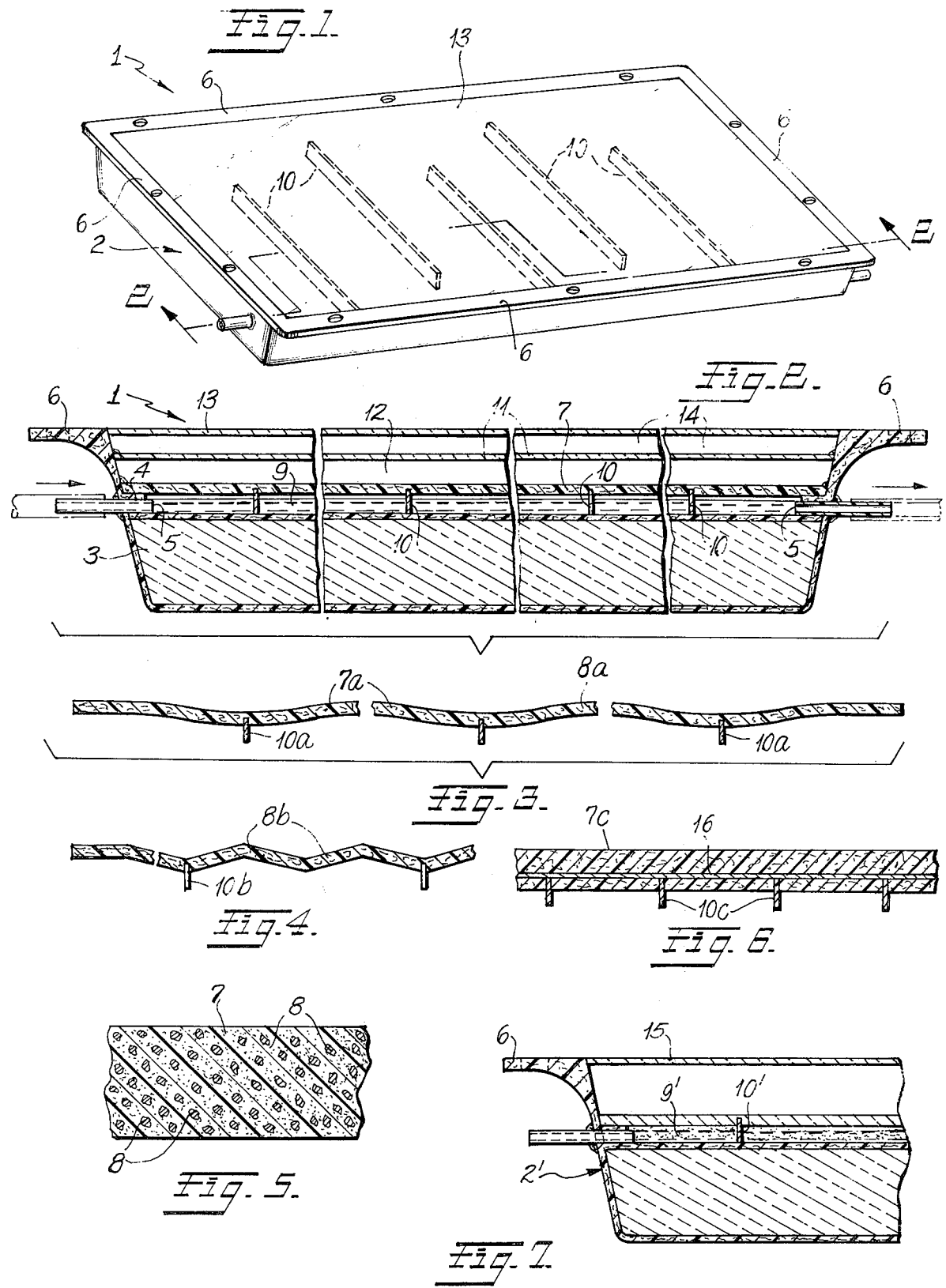

SOLAR COLLECTOR

BACKGROUND OF THE INVENTION

The present invention relates to solar energy panels which gather and convert solar radiation into heat energy. With an evergrowing energy requirement and declining reserves of fossil fuels and oil, solar energy represents a currently comparatively unexploited source of energy which could lessen our dependence on the world's diminishing supply of organic fuels. Space and water heating occupy a significant portion of our total energy requirement; an efficient and economically viable utilization of solar energy for such heating purposes would greatly reduce our reliance on the world's declining organic fuel supplies.

Various types of solar energy panels have been previously developed to utilize the sun's substantially unlimited source of free energy. These prior designs have generally employed metal absorber plates to gather the sun's rays and transfer the resultant heat to an underlying layer of water. While the efficiency of a metal absorber plate is high, the cost of the metal of such a plate, and the milling costs make the use of such materials prohibitatively expensive for commercial purposes. Moreover, metal absorber plates suffer from corrosion and a large weight which make solar energy panels made of these materials commercially unacceptable.

Due to a low cost and low weight, plastics have also been investigated for use in solar energy panels. While these materials eliminate cost, weight, and corrosion problems, the efficiency of these materials as solar energy collectors is low. The efficiency of any solar energy panel depends directly upon the efficiency of the absorber plate in absorbing solar energy and transferring it to a body of heat exchange liquid.

With the low thermal conductivity of plastic materials, the use of absorber plates of plastic material produces a solar energy panel of low efficiency. An example of one such inefficient device is given in Stout et al, U.S. Pat. No. 3,918,430.

Coatings have also been developed in the prior art to increase the absorption of radiant energy. However, due to the low thermal conductivity of plastic materials, a plastic absorber plate will not efficiently transfer radiant heat from the absorptive coating to the heat exchange liquid. Moreover, these coatings suffer from a large cost and a low durability, rendering the commercial use of these coatings on plastic absorber plates unattractive.

The prior art, then, has been unable to develop a solar energy panel which is both efficient and commercially acceptable.

SUMMARY OF THE INVENTION

Accordingly, one object of this invention is to provide an improved solar energy collection device.

Another object of the present invention is to provide a solar energy panel which more efficiently converts solar energy into heat energy, is durable, non-corroding, low-cost, and lightweight.

Still another object of the instant invention is to provide a solar energy panel which is maintenance-free, and easy to install.

It is also an object of the present invention to provide a solar energy panel which can be economically mass-produced.

In accomplishing the foregoing objects, there has been provided according to one embodiment of the invention, a solar energy device which includes an absorber plate of plastic material adapted for absorbing solar enegy in the form of heat and for transferring by conductance the heat to a heat exchange medium. Disposed within the absorber plate is at least one highly heat conductive filler which enhances the thermal conductivity of the plastic absorber plate. In one embodiment, the absorber plate may, as the heat conductive filler, have encapsulated therein a thin sheet of a highly heat conductive material disposed near the surface of that face of the absorber plate which contacts the heat exchange medium. In this embodiment, the plastic absorber plate material may be transparent and an energy absorbing color may be used for the surface of the thin, encapsulated metal sheet. Means such as a housing are also provided for contacting the heat exchange medium with the absorber plate.

In a second embodiment, the solar energy device comprises a transparent sheet material which transmits solar energy directly to a heat exchange medium, which has a pigment of energy absorbing color, which enhances the energy absorbing capacity of the heat exchange medium. A housing means serves to contact the heat exchange medium with the plastic transparent sheet material.

In one preferred embodiment, this invention features a solar energy panel comprising a housing of plastic material with an insulated rear wall and insulated shallow side- and end-walls extending about the edges thereof. An absorber plate of plastic material is mounted on molded flanges extending from the side- and end-walls of the housing in a spaced parallel relation with the housing rear wall to define a flow passage space for a heat exchange fluid such as water. Disposed within the plastic material of the absorber plate is at least one heat conductive filler which imparts increased thermal conductivity to the plastic material forming the absorber plate. The absorber plate also has incorporated thereinto, either separately or on said filter, a pigment of energy absorbing color to facilitate absorption and retention of the sun's energy. According to one aspect of the invention, the absorber plate may comprise a sheet of transparent plastic material which has encapsulated therein a thin sheet of heat conductive material which imparts increased thermal conductivity to the plastic material of the absorber plate. The thin sheet of heat conductive material is disposed near the surface of that face of the absorber plate which contacts the heat exchange medium. Preferably, the sheet of heat conductive material also has on its solar-oriented side a coating to enhance the absorption and retention of the sun's energy. Transparent sheet material is affixed to the panel housing in a spaced parallel relation with the absorber plate to define an insulation space which traps the heat generated by radiant energy from the sun passing through the transparent sheet material and impinging on the absorber plate. Inlet and outlet means are provided in the housing in order to circulate the heat exchange fluid to be heated. Preferably, baffles are also disposed in the flow passage space between the housing rear wall and the absorber plate to distribute the heat exchange fluid uniformly over the surface area of the absorber plate.

The solar energy panel may also employ an absorber plate which may have a corrugated or saw-toothed configuration to increase the surface area of the absorber plate. Baffles may also be used in conjunction with these alternative absorber plates to distribute the heat exchange fluid over the surface area of the absorber, thereby optimizing the heat exchange capacity of the absorber plate.

In another embodiment, a transparent plastic sheet material is mounted on molded flanges extending from the side and end walls of the above-described insulated housing in a spaced parallel relation with the housing rear wall to define a flow passage space. Within the flow passage circulates a heat exchange medium, such as water, which has dissolved therein a dye or pigment of solar energy absorbing color which enhances the solar energy absorptive capacity of the heat exchange medium. The transparent plastic sheet material serves as an interface between the solar rays and the heat exchange medium, transmitting light energy and heat to the heat exchange medium, and mitigating heat loss and evaporation from the heat exchange medium. Preferably, baffles are disposed in the flow passage between the housing rear wall and the transparent plastic sheet material, and are arranged to distribute the colored heat exchange medium over the surface area of the transparent plastic sheet material.

Also provided according to the invention is a method of collecting solar energy employing the device according to the immediately foregoing embodiment, wherein a transparent sheet is employed.

Other objects, features and advantages of the invention will become readily apparent from the following detailed description of preferred embodiments, when considered in light of the attached figures of drawing.

BRIEF DESCRIPTION OF THE DRAWINGS

FIG. 1 is a perspective view of the solar collector of the present invention;

FIG. 2 is an enlarged fragmentary vertical sectional view, taken on the staggered line 2—2 of FIG. 1;

FIG. 3 is a fragmentary longitudinal sectional view of a modification of the absorber plate;

FIG. 4 is a fragmentary longitudinal sectional view, similar to FIG. 3, of still another modification of the absorber plate;

FIG. 5 is an enlarged fragmentary sectional view of the absorber plate of FIG. 2;

FIG. 6 is a fragmentary sectional view of an alternative absorber plate for use in the solar energy device of FIG. 2; and FIG. 7 is a fragmentary vertical sectional view of a modification of the solar collector.

DESCRIPTION OF THE PREFERRED EMBODIMENTS

Referring now to the drawings, the solar energy panel made according to the present invention is generally indicated by the numeral 1 and is designed to provide a commercially acceptable and highly efficient solar heating means. FIG. 1 shows the housing employed in the present invention, generally indicated at 2. The housing is constructed of any lightweight, durable, waterproof, and low cost material. Any material with these characteristics could be employed such as plastics or metal. In its preferred form, the housing is molded of a fiberglass material or a polystyrene or polyurethane plastic material. The housing typically comprises a rectangular configuration, but need not for the purposes of this invention assume this configuration. The housing is formed with a typically flat rear wall with short shallow side- and end-walls integrally molded onto the rear wall. A layer of lightweight and durable insulation 3 is interposed between the other surface layers of the housing by means generally known in the art. One such method would be to mold a thin plastic shell of the desired configuration; a layer of insulation is then adhered over it, and a second layer of plastic then molded above the insulation. The insulation is generally a rigid foam material about 1½ inches thick, which can be foamed polystyrene, but preferably is polyurethane foam. Alternatively, a sandwich structure can be formed in a single molding operation by techniques well known in the art. If polyurethane foam is employed however, it is not necessary to employ a second layer of plastic above the polyurethane insulation. The polyurethane may simply be applied to the housing shell without the need for an additional coating of plastic above the polyurethane.

Flanges 4 are molded onto the housing for supporting and securing the absorber plate to the housing as will hereinafter be described. Inlet and outlet ports 5 are provided to admit and discharge a heat exchange fluid such as water to the solar energy panel. Flanges 6 are also molded onto the top edges of the housing side and end walls for securing the solar energy panel structurally, for example, between rafters.

The absorber plate 7 of the present invention is preferably permanently bonded to the flanges 4 in spaced parallel relation above the rear wall of the housing, typically about ¼ inch for example with a resinous weld. This arrangement defines a flow passage space 9 for the circulation of a heat exchange fluid such as water. The absorber plate functions to collect the solar energy in the form of heat and transfer this heat to a circulating heat exchange fluid, and as such its thermal conductivity is critical to the efficiency of the solar energy panel. To convert the polymers, which have basically good insulating properties, into a heat transfer medium, a highly heat conductive filler, for example in particulate form as generally indicated by reference numeral 8, is dispersed within the plastic material of the absorber plate. This filler may be any material with a thermal conductivity substantially greater than the thermal conductivity of the plastic materials employed in the absorber plate, but is preferably a metal filler with a high thermal conductivity, such as copper, aluminum, iron or suitable metal oxides. The fillers are added in a quantity sufficient to impart a high thermal conductivity to the plastic absorber plate. The specific proportions may vary according to the particular filler used and the desired operating temperature. For greatest efficiency in the case of particulate fillers, however, it has been found that a filler content between about 50 and 400% by weight of the plastic material of the absorber plate, and preferably between about 80 and 180%, by weight, can be used. By completely embedding any metal fillers within the plastic material of the absorber plate, the problem of corrosion is also obviated, since no corrodible materials are exposed to the atmosphere. The filler particles can be of any size or shape, e.g. fibrous, particulate, etc., convenient to be embedded in the plastic absorber plate, for example, between about 0.0005 to 0.2 inches Typically, they are between about 0.01 and 0.03 inch in diameter.

A pigment of an energy absorbing color is preferably also dispersed within and throughout the plastic absorber plate to enhance the absorption and retention of solar energy of the absorber plate. The particular color employed may also vary to obtain the desired efficiency. Applicant has found that the greatest efficiency can be realized by using a flat black pigment. The pigment may be dispersed within the absorber plate by admixing the pigment with the polymeric material during the molding operation. For higher efficiency, according to a preferred embodiment of the invention, pigmentation can be achieved by coating the heat conductive fillers with the pigment, and then distributing the coated fillers at a higher density near the surface of the solar side of the absorber plate. Because the pigment extends throughout the thickness of the plate, the plate is virtually maintenance-free. The thickness of the plate will depend on the particular operating temperature. For proper operation of the solar panel, it is necessary to maintain the rigidity of the absorber plate at high temperature. Consequently, for high operating temperatures, a greater thickness of filled plastic material will be necessary to maintain rigidity. Conversely, glass filaments may be incorporated into the plastic material of the absorber plate to increase structural strength. Absorber plate thicknesses are typically between about 1/16 and ½ inch, preferably between about 1/16 and 3/16 inch. Alternatively, conventional high temperature additives can be incorporated into the plastic to increase its high temperature strength, or commercially available high temperature synthetic resins can be employed, e.g., ATLAC 382E polyester which is a bisphenol A-fumarate resin available from ICI-United States, or ATLAC 38205 which is a 50:50 mixture of this resin and styrene.

In order to provide enhanced rigidity and also to optimize heat transfer between the plate and the heat exchange liquid, flow plates 10 may also extend into the flow passage between the absorber plate and the housing rear wall. These flow plates are preferably constructed from metal but it is also contemplated that they may be plastic. In the preferred embodiment, the flow plates are metal and are embedded in the absorber plate about every 18 inches to further effectuate heat transfer, strengthen the absorber plate, and maintain the housing and absorber plate uniformly separated. The flow plates also function to distribute the heat exchange fluid over the entire surface area of the absorber plate. As can be seen in FIG. 2, these flow plates are staggered so that the circulating fluid flows in heat transfer relationship over the entire surface area, thereby optimizing the heat transfer capacity of the absorber plate.

FIGS. 3 and 4 show two other embodiments of the absorber plate of the present invention, designated 7a and 7b. The configurations of these absorber plates are designed to increase the available heat exchange surface area relative to a flat absorber plate, thereby increasing the overall efficiency of the solar energy panel. These alternative absorber plates also have heat conductive fillers and pigments of energy absorbing color 8a and 8b dispersed therein. They may also be used in conjunction with flow plates 10a, 10b, preferably embedded therein, to increase efficiency.

The above-described absorber plates are highly efficacious when an operating temperature between 140° to 180° F. is desired. However, when a higher operating temperature of the heat exchange medium is desired, it has been found that the absorber plate shown in FIG. 6 may be substituted for absorber plates 7, 7a and 7b to increase the operating temperature up to 160° to 210° F. The absorber plate 7c, shown generally in FIG. 6, comprises a sheet of any suitable transparent plastic material, including glass. Adhered to or preferably encapsulated within the plastic near that face of the absorber plate which contacts the heat exchange medium is a thin sheet of highly heat conductive material 16. The sheet 16 may be formed of any material which has a thermal conductivity substantially above that of the plastic material of the absorber plate. Preferably the heat conductive materials utilized are metals with a large thermal conductivity. Examples of suitable metals include copper, aluminum, tin and other metals possessing a high thermal conductivity, general availability, and low cost. Aluminum and copper are particularly preferred. The solar side of the sheet 16 is coated with an energy absorbing pigment to enhance the absorption and retention of the impinging solar energy. The energy absorbing pigment may be a flat black paint, or it may be a selective coating such as black nickel or black chrome. Due to its low cost and high durability, though, the pigment is preferably a flat black paint. Pigments containing other energy absorbing colors may also be employed. However, due to its high absorptive capacity, black is especially preferred. Since the thin metal sheets are preferably completely embedded within the plastic material of the absorber plate, the problem of corrosion is thereby eliminated, as no corrodible materials are exposed to the atmosphere or the heat exchange medium.

The thickness of the sheet 16 may also vary to obtain the desired efficiency. It has been found that best results are obtained with a thickness of from about 0.00003 to 0.003 inches, with a thickness of about 0.0003 inches being preferred. Due to its great economy, common household-type aluminum foil finds particular application in the present invention.

In order to enhance the rigidity of the absorber plate 7c and to distribute the heat exchange fluid over the entire surface area of the absorber plate, flow plates 10c are also used in conjunction with the absorber plate 7c, and are preferably embedded therein. It is also possible to provide the absorber plate with a corrugated or undulating crosssection as illustrated in FIGS. 3 and 4.

Where only low operating temperatures are required, however, a thin film of a plastic material of an energy absorbing color can be substituted for the metal sheet 16 shown in FIG. 6, and this plastic film is applied to that face of the absorber plate which contacts the heat exchange medium. This arrangement features a greater economy than the abovedescribed absorber plates, and eliminates a large source of heat loss by juxtaposing the absorbing surface next to the heat exchange medium. The color of this film is preferably black to exploit the absorptive capacity of this color, although it is within the contemplation of the present invention that other energy absorbing colors may be employed.

The absorber plates of the present invention may be constructed of any suitable synthetic resinous material. The particular resins chosen may also be either thermoplastic or thermosetting resins. Examples of suitable resinous material within the contemplation of this invention would include polyesters, polyamides, polyacrylates, polycarbonates, polyolefins, or polyvinyl halides, etc. In the preferred embodiment, however, the absorber plate is preferably formed of polyester containing glass fiber reinforcement, i.e., a fiberglass composition.

In order to trap the heat generated by light energy impinging on the surface of the absorber plate, and prevent heat loss back to the atmosphere, transparent sheet material is disposed above the absorber plate in spaced parallel relation and is secured to the upper edges of the side and end walls of the housing by screws, clamps or other suitable means. The entire outside perimeter is preferably calked to produce an air tight insulation space between the transparent sheet material and the absorber plate. This sheet material could be glass or clear plastics. In its preferred form, though, the transparent sheet material is ultraviolet-light-durable plastic such as polyacrylate or polycarbonate, e.g. LEXAN, PLEXIGLASS, etc. The transparent sheet material can be a single sheet; however, in the preferred embodiment, two sheets of clear plastic material are employed, the outermost sheet being formed of ultraviolet-light-durable plastic. In this preferred embodiment, a first insulation space 12 is defined by disposing a first clear sheet material 11 in spaced parallel relation above the absorber plate. A second insulation space 14 is then defined by disposing a second layer of clear sheet material 13 above the first sheet of clear plastic 11. This double insulation space arrangement has been found to increase the efficiency of the solar panel.

FIG. 7 illustrates a second solar energy panel according to the present invention where like numerals refer to similar elements. This second solar energy panel is particularly efficacious where only a low operating temperature is required, but a very high efficiency is desirable. This device may be advantageously employed with an operating temperature up to about 160° F. Since, no absorbing surface is required in this embodiment, a large economy in manufacture is also accrued. A sheet of transparent plastic sheet material 15 is mounted in a spaced parallel relation with the back wall of the above-described insulated housing, generally indicated at 2'. This transparent sheet material may be constructed of any suitable material which is lightweight, transparent, and durable. Glass and suitable synthetic resins are preferred. The particular resins chosen may be either thermosetting or thermoplastic. Preferably, the resinous material chosen is also an ultraviolet, light, durable plastic material. In the preferred embodiment, the sheet material 15 is preferably transparent polyacrylate or polycarbonate.

Transparent plastic sheet material 15 and housing 2 define a flow passage 9' through which circulates a heat exchange medium, such as water, which has dissolved therein a dye or pigment of energy absorbing color. The dye or pigment enhances the heat absorbent and retentive capacity of the heat exchange medium. This dye or pigment may be any color which is highly heat absorptive. The particular color employed may vary to obtain the desired efficiency. Applicant has found, however, that the greatest efficiency can be realized by using a black or greenish-black dye. The dye or pigment of energy absorbing color is dissolved in the heat exchange medium in sufficient quantity to render the heat exchange medium highly heat absorbent. The particular concentrations will vary with the specific pigment used and the desired operating temperature. Generally, however, applicant has found that a pigment concentration between about 1 to 6 grams per gallon of heat exchange medium is most efficacious, with 2 grams per gallon of heat exchange medium being preferred.

In operation, the heat exchange medium with dissolved dye or pigment is pumped into the insulating housing 2'. Solar energy impinges on the transparent sheet material where the solar energy is concentrated and is then transmitted to the heat exchange medium. Transparent sheet material 15 also provides an insulative barrier to mitigate heat loss from the heat exchange medium. As the heat exchange medium circulates through the flow passage 9', it absorbs solar energy, the dissolved dye or pigment increasing the heat absorbing capacity of the heat exchange medium. After circulation through the solar energy panel, the absorbed heat of the heat exchange medium can then be employed either directly or indirectly for any desired heating purposes.

Transparent plastic sheet material 15 may also have a corrugated configuration or a saw-toothed configuration, as seen in FIGS. 3 and 4, in addition to the flat configuration of FIG. 7. These other configurations may be employed where a large surface area for the transparent sheet material is desirable or where such a configuration is desired to assist in distributing the heat exchange medium over the surface area of the transparent plastic sheet material. Alternatively, means such as flow plates 10', may be disposed within the flow passage 9' to distribute the heat exchange medium or produce a particular flow pattern. In the preferred embodiment, sheet material 15 has embedded therein flow plates 10' which extend into flow passage 9' to facilitate the uniform circulation of the heat exchange medium throughout the flow passage 9'.

While water has been indicated as the preferred heat exchange medium, it is obvious that many other fluids could also be used such as alcohol, salt water, and liquid and/or gaseous hydrocarbons.

As Applicant has shown, his solar energy panels achieve high efficiency, are lightweight, durable and economically viable. Applicant has found that the solar energy panels of the present invention are approximately 40% to 80% efficient, transferring more than half of the absorbed energy to the underlying water layer. Thus, the invention accomplishes its aforestated goals and advantages.

What is claimed is:
1. Solar energy collection means, comprising
  (a) energy absorber plate means including
    (1) a relatively thin sheet formed or a heat conducting metal;
    (2) a layer of solar-energy-absorbing pigment material coated upon at least one face of said metal sheet;
    (3) a layer of transparent synthetic resinous plastic material completely encapsulating said coated metal sheet; and
    (4) a plurality of flow plates each formed of a heat conductive material; said flow plates being in-heat transmitting engagement at one end with said heat conductive sheet, said flow plates extending completely through and protruding at their other end beyond said layer of transparent material; and
  (b) means for directing a heat-exchange fluid in contact with the protruding end portions of said flow plates, respectively, whereby when the coated surface of said sheet is arranged to face a source of solar energy, the rays of solar energy are transmitted to said solar-energy-absorbing layer to heat the sheet, and the heat is then transmitted to said heat exchange fluid via said flow plates.

2. Solar energy collection means as defined in claim 1 wherein said synthetic plastic material is selected from the group consisting of polyester resins, polystyrene resins, and polyurethane resins.

3. Solar energy collection means as defined in claim 1 wherein said solar-energy-absorbing pigment material is selected from a group consisting of black nickel and black chrome.

4. Solar energy collection means as defined in claim 1, wherein said metal sheet has a thickness sufficient to impart a high thermal conductivity to said absorber plate.

5. Solar energy collection means as defined in claim 4, wherein said metal sheet has a thickness between 0.00003 and 0.0003 inches.

6. Solar energy collection means as defined in claim 1, wherein said layer of synthetic plastic material further includes transparent glass filaments whereby, the rigidity of said absorber plate is increased.

* * * * *